United States Patent [19]

Cesna

[11] Patent Number: 4,693,012

[45] Date of Patent: Sep. 15, 1987

[54] MEASURING BAR FOR FREE ABRASIVE MACHINES

[75] Inventor: Joseph V. Cesna, Niles, Ill.

[73] Assignee: Speedfam Corporation, Des Plaines, Ill.

[21] Appl. No.: 755,685

[22] Filed: Jul. 16, 1985

[51] Int. Cl.⁴ .............................................. G01B 5/20
[52] U.S. Cl. .................................. 33/533; 33/172 R; 51/165 R
[58] Field of Search ................. 33/533, 169 R, 172 R; 73/104, 105; 51/165 R, 209 R, 262 R, 262 T

[56] References Cited

U.S. PATENT DOCUMENTS

| | | | |
|---|---|---|---|
| 1,595,417 | 8/1926 | Rayton | 33/172 R |
| 2,729,891 | 1/1956 | Winter | 33/169 R |
| 3,161,961 | 12/1964 | Lyna et al. | 33/533 |
| 3,762,053 | 10/1973 | Day | 33/533 |
| 3,911,586 | 10/1975 | Malonda | 33/533 |

Primary Examiner—Charles Frankfort
Assistant Examiner—Patrick R. Scanlon
Attorney, Agent, or Firm—Charles F. Pigott, Jr.

[57] ABSTRACT

A measuring bar for determining flatness and deviations therefrom comprises a rigid bar, and a plurality of support feet projecting from the bar. The support feet have free ends which occupy a common, flat plane, the free ends of each of the support feet defining a transverse supporting surface of essentially 0.005 to 0.025 inch across. Measuring devices are carried on the bar for measuring the spacing from the flat plane of at least one point on a target surface against which the support feet free ends rest, the measured point being spaced from the support feet.

11 Claims, 3 Drawing Figures

MEASURING BAR FOR FREE ABRASIVE MACHINES

BACKGROUND OF THE INVENTION

Apparatus for free abrasive machining or lapping is commercially available, being sold by the Speedfam Corporation of Des Plaines, Ill. See also, for example, U.S. Pat. Nos. 4,270,314 and 4,519,168 and other patent references cited therein. Typically, such free abrasive machining apparatus includes a horizontally positioned rotary wheel which provides abrasive action to the work piece. A short metal tube (a "truing ring") is usually placed on the rotary wheel with the axis of the tube perpendicular to the wheel, and the work piece is placed within the tube. Some form of pressure is applied to the work piece from a piston or a weight, and the truing ring is retained in position so that the rotary wheel can rotate under it, in such a manner that the truing ring can rotate. This rotation takes place because portions of the rotary wheel which are radially nearer to the center of rotation are moving more slowly than the corresponding portions farther away from the center of rotation of the rotary wheel.

Abrasive is placed upon the rotary wheel in slurry form, to accomplish the free abrasive machining process.

Periodically, it is necessary to check the flatness of the rotary wheel which generally must remain within certain limits of desired flatness in order to obtain correspondingly flat work pieces from the abrasive process. Typically, the rotary wheel tends to become concave due to the continued abrasive action of operation. When it reaches a certain degree of concave curvature, typically only a very few thousandths of an inch, the rotary wheel shape must be corrected, since it is no longer capable of providing the desired flatness by abrasive action to the work pieces.

Additionally, a so-called "tracking condition" can occur, created in the rotary wheel by placing excessively high pressure on the work piece, or by a failure to provide enough abrasive slurry. This tracking condition is an irregularity in the uniform curvature of the almost flat surface of the rotary wheel. The tracking condition can show up very quickly as a deviation in the shape of the surface by 0.0005 inch (0.5 mil.) or the like. In the event that the tracking condition takes place, it must be promptly detected and dealt with by correction of the rotary wheel, since parts produced on such a damaged rotary wheel are likely to not meet desired specifications. Unfortunately, the naked eye cannot determine when the rotary wheel should be corrected.

Accordingly, a test for flatness of a rotary wheel is conventionally used in which all of the abrasive slurry is removed from the wheel, a time consuming job. Then, a precision straight edge is placed upon the wheel, and the user attempts to slide shims of known thickness under the straight edge to determine deviations from flatness in the rotary wheel, to search for the presence of tracking condition or to generally determine when the wheel has lost its flatness to such an extent that it should be corrected.

This flatness test requires about ten to twenty minutes of time, counting the necessary cleanup of the wheel before the test can be performed. Also a considerable amount of fumbling usually takes place, as one searches for the right shim to slide under the straight edge, to determine the deviation from flatness of the rotary wheel.

In accordance with this invention, a measuring bar is provided which can be used without cleanup or removal of abrasive from the rotary wheel. This alone provides extremely significant savings of time on the order of ten minutes or more per measurement! Additionally, no shims are required, but instead a direct readout can be obtained from the measuring bar of this invention, so that one can determine the condition of the rotary wheel in the middle of a production run, without cleaning the abrasive off of its face, in a matter of a minute or so, rather than being saddled with a ten to twenty minute process, during which time production is halted.

DESCRIPTION OF THE INVENTION

In accordance with this invention, a measuring bar for determining flatness and deviations therefrom is provided. The measuring bar comprises: a rigid bar and a plurality of support foot means projecting from the bar, said support foot means having free ends which collectively occupy a common, flat plane. The free ends of each of said support foot means define a transverse supporting surface essentially 0.005 to 0.025 inch across.

Means are also carried on the bar for measuring the spacing from said flat plane of at least one point on a target surface against which the support foot means free ends rest, with the point being spaced from the support foot means.

Typically, the target surface will be a rotary wheel of apparatus for free abrasive machining, as previously described. By this invention, since the support feet define transverse supporting surfaces which are so small in area, being preferably only 0.007 to 0.01 inch across, the transverse supporting surfaces can press down into a mass of abrasive in the slurry, shouldering the abrasive particles aside to enter into substantial contact of the target surface, without significant spacing between the supporting surface and target surface being created by intervening abrasive particles. Thus, it becomes possible for the common, flat plane defined by the support feet to be in contact at a plurality of points with the target surface as the measuring bar sits on the surface, despite the presence of the abrasive slurry from the target surface.

Then, the means carried by the bar for measuring the spacing of at least one point on the target surface from the flat plane provides the user with information as to the shape of the target surface and its suitability for further use.

Preferably, one of the said support feet is present adjacent to a first end of the bar, and a spaced pair of support foot means is present adjacent a second end of the bar, with the support feet being in triangular relation to each other so that the bar stands in stable manner on the target surface.

Each of the spaced pair of support feet may be spaced a different distance from the second end of the measuring bar in such a manner that all three of the support feet may be positioned equidistantly from the periphery of a disc-shaped target surface of predetermined size, such as the rotary wheel used in free abrasive machining.

The spacing measuring means may be spring loaded indicator with a dial readout showing the deviation of its spring loaded tip from the common plane defined by the feet of the measuring bar. Such indicators are available, for example, from the L. S. Starrett Co. of Athol, Mass. Alternatively, other systems may be used, for example, sonic or laser measuring apparatus.

The spacing measuring means may be position to measure the spacing of a point adjacent to the typical inner, central aperture extending through a rotary wheel for free abrasive machining, when the support foot means are equidistantly positioned from the periphery of the wheel, being typically spaced less than an inch from such periphery.

Added spacing means, being typically another identical spring type indicator, may be present to measure the spacing in a central area at the side of the wheel to check for uniform curvature therein. In the event of a substantial deviation from the norm, the presence of a tracking condition is indicated.

A pair of thermally insulating handles are typically also present, since direct handling of the measuring bar can cause heat transfer from the fingers to the bar, with resultant temporary distortion of the bar which can result in a reading error. Typically, the handles extend in a direction transverse to the axes of the support foot means.

The transverse supporting surfaces of the support feet undergo very high pressures per square millimeter of area, due to their very small area. Accordingly, it is preferred for the transverse supporting surfaces to be made of an ultra hard material, for example, diamond, sapphire, or tungsten carbide. Similarly, each of the measuring means may have contact foot means for similar contact with a target surface. The contact foot means of spacing measuring means preferably has similar ultra small area to insure proper measurement of the position of the target surface despite the presence of abrasive slurry on top, and it also may be made of an ultra hard material such as those described above.

DESCRIPTION OF SPECIFIC EMBODIMENT

Figure 1:
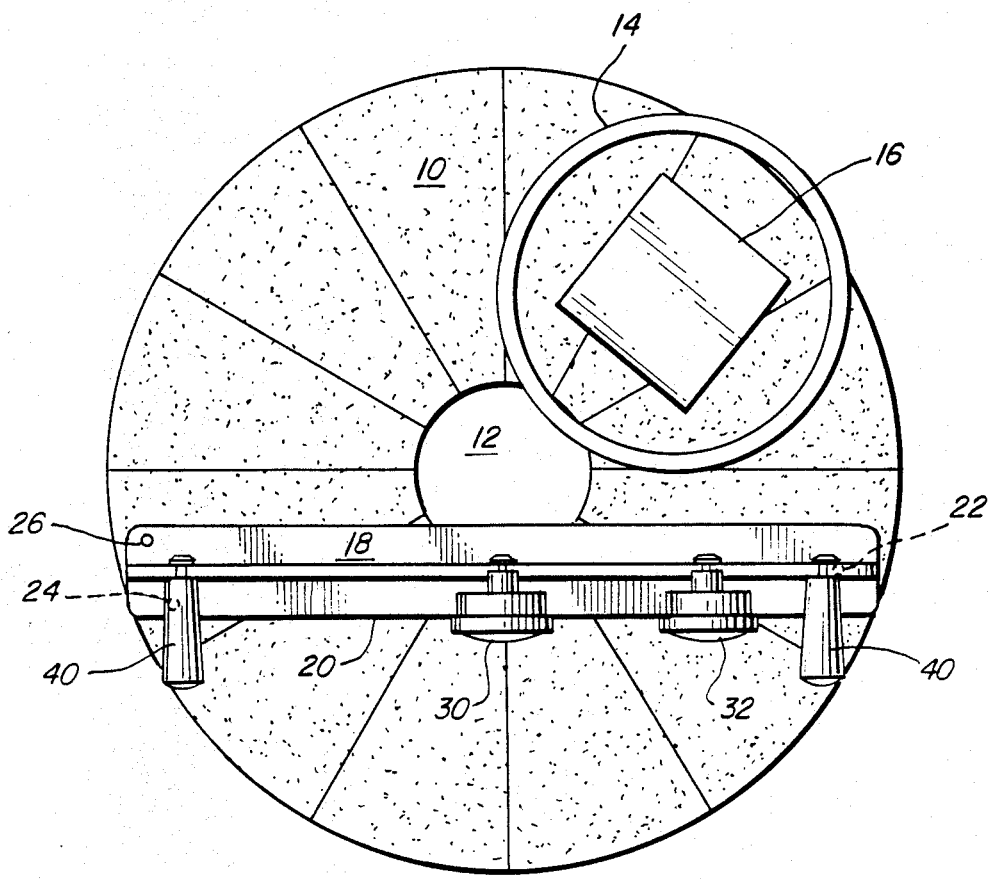
FIG. 1 is a plan view of free abrasive machining apparatus in which the rotary wheel is being measured for flatness by the measuring bar of this invention.

Referring to the drawings, a rotary wheel 10 of a free abrasive machining device is disclosed. Wheel 10 defines a central aperture 12, and in operating condition typically carries on its surface a short metal sleeve or ring 14 which surrounds work-piece 16. Metal sleeve 14 is positioned with one of its ends in contact with rotary wheel 10, and either a weight or a pressure shaft may be used to hold sleeve 14 in one position as wheel 10 rotates, while permitting sleeve 14 to rotate in its position. The free abrasive machining device may be of any conventional design.

In accordance with this invention, measuring bar 18 is provided for periodically measuring the flatness of rotary wheel 10.

During operation, rotary wheel 10 carries an abrasive slurry for shaping of the face of work-piece 16 which abuts against rotary wheel 10 with the abrasive slurry positioned between the two surfaces. The rotation of wheel 10 may be stopped, and measuring bar 18 may be placed upon its surface in the position shown in FIGS. 1 and 2. Measuring bar 18 includes rigid anodized aluminum bar 20 of T-shaped cross section, and, in this specific embodiment, three support feet 22, 24, 26 taper to practically a point at their free ends, where in each case a transverse supporting surface 28 defines an area which is essentially about 0.007 to 0.01 inch across, each defining, for example with a diameter of 0.008 inch, a roughly circular area of about two ten thousandths of a square inch. Since the weight of the measuring bar rests upon three such small areas, the pressure per square inch is relatively high, causing surfaces 28 to force themselves through the abrasive slurry and to typically thrust aside abrasive particles, to enter into contact with the real surface of rotary wheel 10. Surfaces 28 may be made from tungsten carbide, and are built to define a plane between them, which plane is thus brought into contact with rotary wheel 10.

Figure 2:
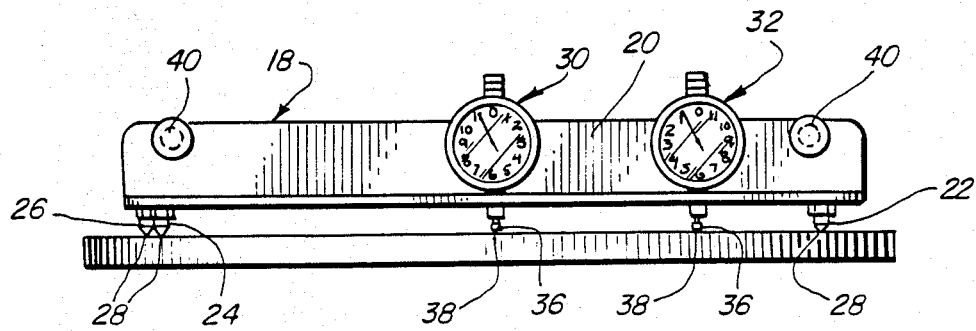
FIG. 2 is an elevational view of the measuring bar of FIG. 1.

It can be seen that support foot 26 is closer to the end of bar 18 than support foot 24. In such a position, as shown in FIG. 1, all three support feet may be positioned equidistantly from the periphery of disc or wheel 10. The area close to the periphery of wheel 10 will tend to retain its original configuration, being ground away only minimally.

Distance indicators 30, 32 carry gauges which may be set to read at zero when the contact feet or ends 38 of spring plungers 36 occupy the plane defined by the three supporting surfaces 28. Such gauges 30, 32 are commercially available as previously described. The ends 38 of their respective plungers 36 may also define similar equally small areas as supporting surfaces 28 and may be made of tungsten carbide or the like. Accordingly, the ends 38 of plungers 36 can also penetrate the layer of abrasive slurry, to contact rotary wheel 10 itself when measuring bar 10 is placed on such a rotary wheel. Thus, an instant readout is provided by gauges 30, 32 of the deviation of two spaced points of wheel 10 from the plane defined by surfaces 28. This deviation may be expressed in tenths of a mil, for example, and from such deviation the flatness of wheel 10 can be determined, plus the presence or absence of a tracking condition.

The above operation is performed in seconds rather than 20 or 30 minutes, as in the prior art. Gauges 30, 32 may be calibrated by placing bar 18 on a flat master bar, at which time gauge 30, 32 should read zero.

Thermally insulating handles 40 project laterally from measuring bar 18 at locations adjacent the respective ends thereof.

Figure 3:
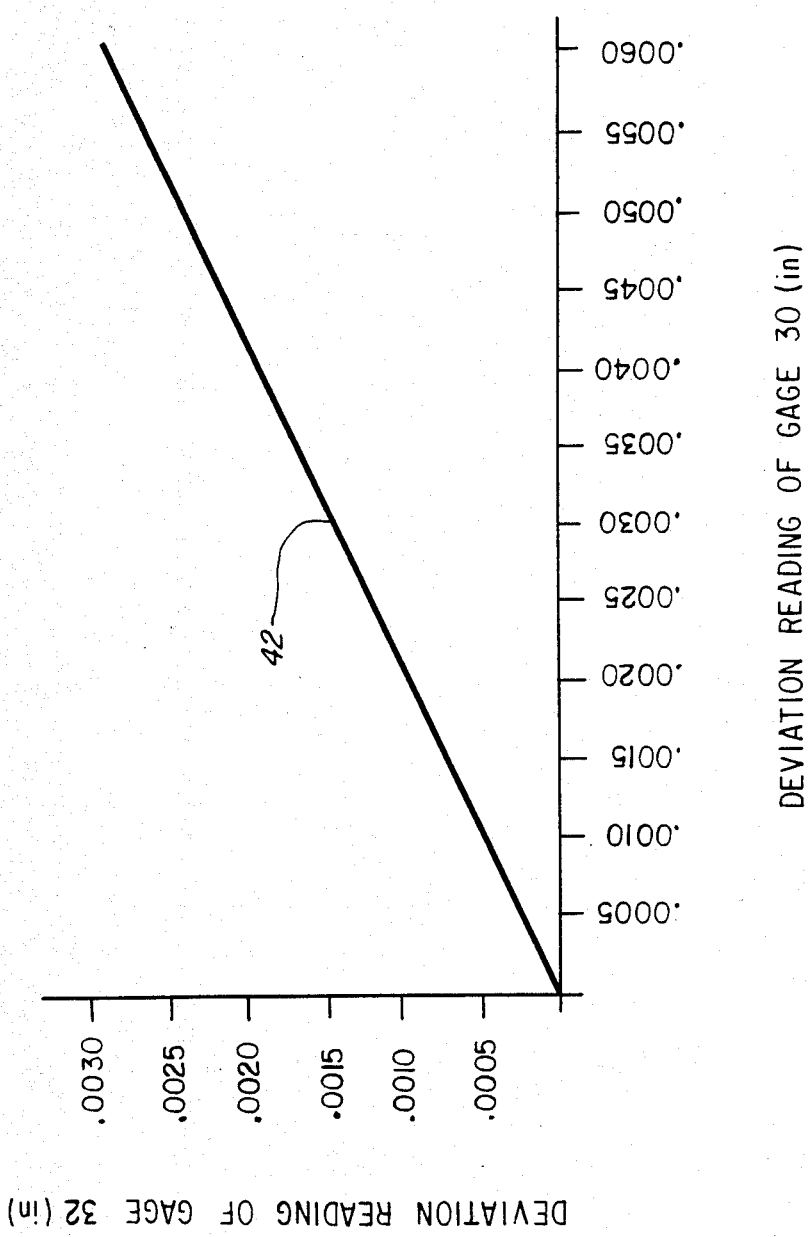
FIG. 3 is a chart showing the ideal relationship between the readings of the two measuring means of the measuring bar of FIGS. 1 and 2, where major deviation from such relationship indicates a tracking condition.

It will be noted that gauge 30 is positioned adjacent central aperture 12 of wheel 10, while gauge 32 is positioned at a central point between the aperture and periphery thereof. After the individual deviation read-outs of gauges 30, 32 have been determined, one may turn to a wheel contour chart of the type shown in FIG. 3, which illustrates ideal deviations from the zero plane defined by surfaces 28 as indicated by both gauges 30, 32. Some deviation is of course to be expected. However, if gauge 30 reads a deviation of 2 mil (0.002), the expected deviation indicated by gauge 32 should be 1 mil (0.001), as shown by line 42 of FIG. 3. If the deviation indicated by gauge 32 is that, then the wheel is in a proper contour, with line 42 indicating the optimum contour range. If, however, gauge 32 indicates a value that deviates substantially from line 42, then the presence of a tracking condition is indicated, generally calling for the correction of rotary wheel 10.

In the absence of such correction, the work pieces 16 which are processed may fail to meet flatness specifications. Thus, the measuring bar of this invention makes it possible to frequently check rotary wheels 10 on abrasive processing machines for proper contour and profile, replacing the prior art method of checking which requires about ten minutes to one half hour to complete. Because of this, the wheels of abrasive processing machines, and other apparatus for different purposes as well, may be frequently checked by the apparatus of this invention, since each checking procedure lasts no more than a minute or so. Incipient unfavorable conditions may be quickly detected, and corrective action taken before damage is done, while saving a great deal of time in the checking operation by use of this invention.

The above has been offered for illustrative purposes only and is not intended to limit the scope of the invention of this application, which is defined in the claims below.

That which is claimed is:

1. A measuring bar for determining flatness and deviations therefrom, which comprises: a rigid bar, a plurality of support foot means projecting from said bar, said support foot means having free ends which collectively occupy a common, flat plane, the free ends of each of said support foot means defining a transverse supporting surface essentially 0.005 to 0.025 inch across, and means rigidly carried on said bar from measuring the spacing from said flat plane of at least one point on a target surface against which said support foot means free ends rest, said point being spaced from the support foot means, said spacing measuring means having an area of contact which is essentially 0.005 to 0.025 inch across, for contact with the target surface, one of said support foot means present being adjacent a first end of said bar and a spaced pair of support foot means being present adjacent a second end of said bar, said support foot means being in triangular positional relation to each other, each support foot means of the spaced pair being spaced a different distance from said second end, whereby all three of said support foot means may be positioned equidistantly from the periphery of a disc target surface of predetermined size.

2. The measuring bar of claim 1 in which said spacing measuring means is positioned to measure the spacing of a point adjacent an inner, central aperture on the side of a rotary wheel of free abrasive machining apparatus, when said support foot means are equidistantly positioned on said side from the periphery of said wheel.

3. The measuring bar of claim 2 in which added spacing means are present to measure said spacing in a central area of the side of said wheel to check for uniform curvature therein.

4. The measuring bar of claim 1 in which a pair of thermally insulating handles are present, one handle being positioned adjacent each end of said bar, said handles extending in a direction transverse to the axes of said support foot means.

5. The measuring bar of claim 1 in which the free ends of said support foot means have transverse supporting surfaces which are essentially 0.007 to 0.01 inch across, for contact with the target surface.

6. The measuring bar of claim 1 in which said transverse supporting surfaces are made of a material selected from the group consisting of diamond, sapphire, and tungsten carbide.

7. A measuring bar for determining flatness and deviations therefrom, which comprises: a rigid bar, a plurality of support foot means projecting from said bar, one support foot means being present adjacent to a first end of said bar and a spaced pair of support foot means being present adjacent a second end of said bar, said support foot means being in triangular positional relation to each other, said support foot means having free ends which collectively occupy a flat plane, the free ends of each said support foot means each defining a transverse supporting surface which is essentially 0.007 to 0.01 inch across, each of said spaced pair of support foot means being spaced a different distance from said second end in such a position that all three of said support foot means may be positioned substantially equidistantly from the periphery of a disc target surface of predetermined size, and means rigidly carried on said bar for measuring the spacing from said flat plane of at least one point on a target surface against which said support foot means free ends rest.

8. The measuring bar of claim 7 in which said transverse supporting surfaces are made of a material selected from a group consisting of diamond, sapphire, and tungsten carbide.

9. The measuring bar of claim 8 in which said spacing measuring means is positioned to measure the spacing of a point adjacent to a central aperture of a rotary wheel of free abrasive machining apparatus, when said support foot means are equidistantly positioned from the periphery of said wheel.

10. The measuring bar of claim 9 in which added spacing measuring means are present to measure said spacing in the central area of the side of said wheel, to check for uniform curvature therein.

11. The measuring bar of claim 10 in which a pair of thermally insulated handles are present, one handle being positioned adjacent at each end of said bar, said handles extending in a direction transverse to the axes of said support foot means.

* * * * *